United States Patent
Chang et al.

(10) Patent No.: US 12,386,036 B2
(45) Date of Patent: Aug. 12, 2025

(54) DETECTION DEVICE AND DETECTION METHOD WITH CALIBRATION FUNCTION

(71) Applicant: Acer Incorporated, New Taipei (TW)

(72) Inventors: Kun-Sheng Chang, New Taipei (TW); Chien-Ju Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 355 days.

(21) Appl. No.: 18/063,719

(22) Filed: Dec. 9, 2022

(65) Prior Publication Data
US 2024/0036164 A1    Feb. 1, 2024

(30) Foreign Application Priority Data
Jul. 29, 2022  (TW) .................................. 111128491

(51) Int. Cl.
*G01S 7/40*  (2006.01)
(52) U.S. Cl.
CPC .................. *G01S 7/4021* (2013.01)
(58) Field of Classification Search
CPC ........ G01S 13/0209; G01S 13/74; G01S 7/40; G01S 7/4021
See application file for complete search history.

(56) References Cited

U.S. PATENT DOCUMENTS

| | | |
|---|---|---|
| 10,114,117 B2 | 10/2018 | Salmen et al. |
| 10,782,385 B2 | 9/2020 | Brousard et al. |
| 2015/0029053 A1* | 1/2015 | Dewberry ............... G01S 11/02 342/118 |
| 2016/0124089 A1* | 5/2016 | Meinherz ............. G01S 17/894 356/5.01 |
| 2019/0167500 A1* | 6/2019 | Baker ...................... G01S 7/03 |
| 2022/0179259 A1 | 6/2022 | Kawawa et al. |

FOREIGN PATENT DOCUMENTS

| | | |
|---|---|---|
| CN | 111679267 A | 9/2020 |
| CN | 113296053 A | 8/2021 |
| CN | 113655437 A | 11/2021 |
| EP | 3 951 426 A1 | 2/2022 |
| TW | 201721174 A | 6/2017 |
| WO | 2015/132361 A1 | 9/2015 |

OTHER PUBLICATIONS

Chinese language office action dated Mar. 31, 2023, issued in application No. TW 111128491.

* cited by examiner

*Primary Examiner* — Timothy X Pham
(74) *Attorney, Agent, or Firm* — McClure, Qualey & Rodack, LLP

(57) ABSTRACT

A detection device with a calibration function is configured to detect an object. The detection device includes an antenna element, a transmission line, a detection circuit, and a processor. The transmission line is coupled to the antenna element. The detection circuit is coupled to the transmission line. The detection circuit performs a detection process, so as to obtain an estimated distance between the antenna element and the object. The processor is coupled to the detection circuit. The processor calculates the calibrated distance by subtracting the error distance from the estimated distance.

10 Claims, 3 Drawing Sheets

DETECTION DEVICE AND DETECTION METHOD WITH CALIBRATION FUNCTION

CROSS REFERENCE TO RELATED APPLICATIONS

This Application claims priority of Taiwan Patent Application No. 111128491 filed on Jul. 29, 2022, the entirety of which is incorporated by reference herein.

BACKGROUND OF THE INVENTION

Field of the Invention

The disclosure generally relates to a detection device, and more specifically, to a detection device with a calibration function.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

When a mobile device detects a distance to an object, the detection result may have some errors due to the non-ideal effect of its transmission line. Accordingly, there is a need to propose a novel solution for solving the problems of the prior art.

BRIEF SUMMARY OF THE INVENTION

In an exemplary embodiment, the invention is directed to a detection device with a calibration function. The detection device is configured to detect an object. The detection device includes an antenna element, a transmission line, a detection circuit, and a processor. The transmission line is coupled to the antenna element. The detection circuit is coupled to the transmission line. The detection circuit performs a detection process, so as to obtain an estimated distance between the antenna element and the object. The processor is coupled to the detection circuit. The processor calculates the calibrated distance by subtracting the error distance from the estimated distance.

In some embodiments, the detection process is a ToF (Time of Flight) process.

In some embodiments, the detection circuit uses the antenna element to transmit the detection signal to the object and receive a feedback signal from the object. Both the detection signal and the feedback signal operate in a UWB (Ultra-Wide Band) frequency band.

In some embodiments, the error distance is proportional to the length of the transmission line.

In some embodiments, the error distance is substantially equal to 1.58 times the length of the transmission line.

In another exemplary embodiment, the invention is directed to a detection method with a calibration function. The detection method includes the steps of: providing an antenna element, a transmission line, and a detection circuit, wherein the antenna element is coupled through the transmission line to the detection circuit; performing a detection process via the detection circuit, so as to obtain an estimated distance between the antenna element and the object; and calculating the calibrated distance by subtracting the error distance from the estimated distance.

In some embodiments, the detection process includes: using the antenna element to transmit the detection signal to the object; and using the antenna element to receive a feedback signal from the object. Both the detection signal and the feedback signal operate in a UWB frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
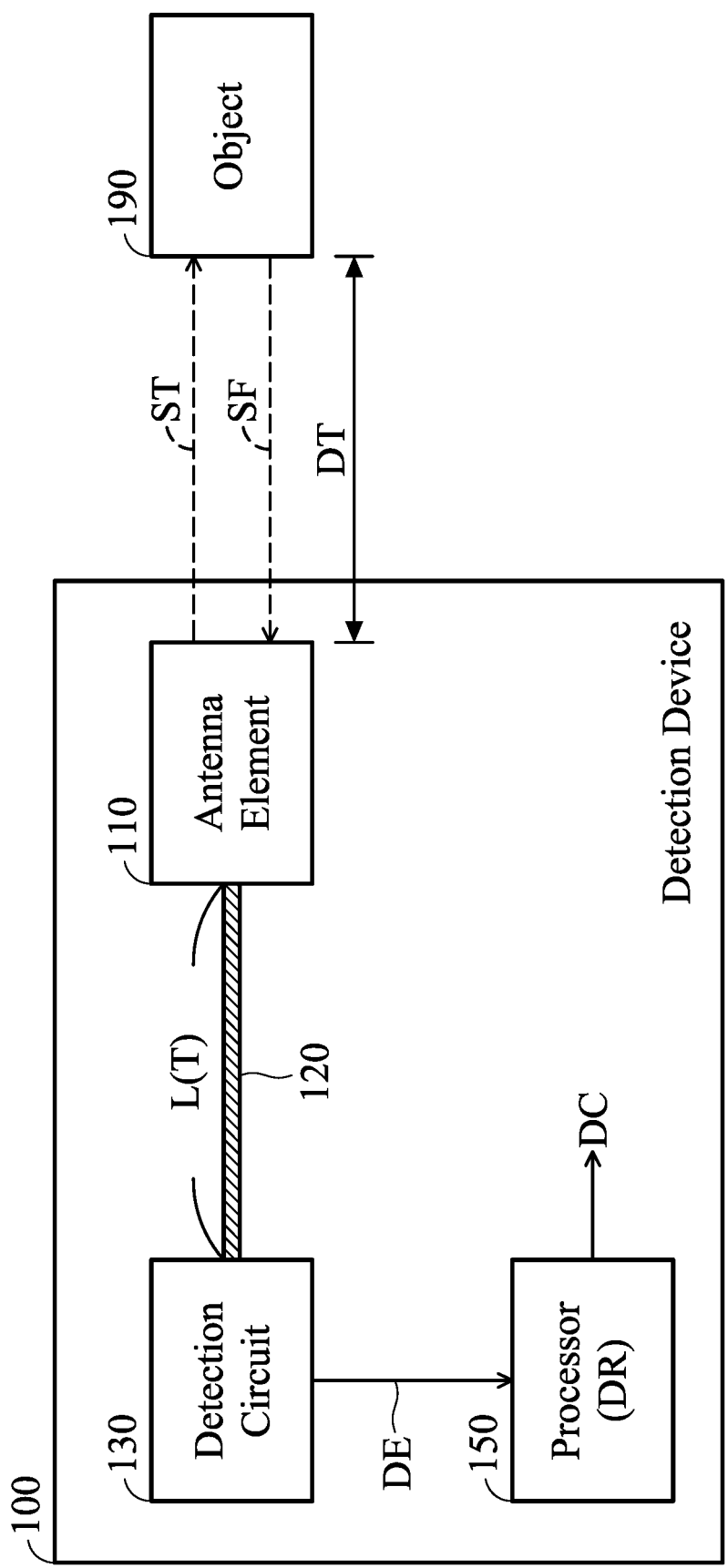
FIG. 1 is a diagram of a detection device with a calibration function according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 with a calibration function according to an embodiment of the invention. The detection device 100 may be a mobile device, such as a notebook computer or a tablet computer. The detection device 100 is configured to detect an object 190, which is not any portion of the detection device 100. For example, the object 190 may be an RFID (Radio Frequency Identification) tag, but it is not limited thereto. In the embodiment of FIG. 1, the detection device 100 includes an antenna element 110, a transmission line 120, a detection circuit 130, and a processor 150. It should be understood that the detection device 100 may further include other components, such as a speaker, a touch control module, and/or a power supply module, although they are not displayed in FIG. 1.

The shape and type of the antenna element 110 are not limited in the invention. For example, the antenna element 110 may be a monopole antenna, a dipole antenna, a patch antenna, a loop antenna, a PIFA (Planar Inverted F Antenna), or a hybrid antenna.

The transmission line 120 is coupled to the antenna element 110. The transmission line 120 may be a coaxial cable with a length of L. In alternative embodiments, the detection device 100 uses a different-type transmission line, such as a microstrip line or a CPW (Coplanar Waveguide), but it is not limited thereto.

The detection circuit 130 is coupled to the transmission line 120. That is, the antenna element 110 is coupled through the transmission line 120 to the detection circuit 130. The detection circuit 130 may be implemented with an IC (Integrated Circuit). For example, the detection circuit 130 may be an UWB (Ultra-Wide Band) IC for processing a variety of signals operating in the UWB frequency band. The detection circuit 130 can perform a detection process, so as to obtain an estimated distance DE between the antenna element 110 and the object 190. It should be noted that the estimated distance DE is slightly different from the real distance DT between the antenna element 110 and the object 190.

The processor 150 is coupled to the detection circuit 130, so as to receive the relative information of the estimated distance DE. Next, the processor 150 can calculate the calibrated distance DC by subtracting the error distance DR from the estimated distance DE. Finally, the processor 150 can output the relative information of the calibrated distance DC to other components (not shown), such as a positioning system. In some embodiments, the relationship between the above distances will be described as follow:

$$DC=DE-DR \qquad (1)$$

where "DC" represents the calibrated distance DC, "DE" represents the estimated distance DE, and "DR" represents the error distance DR.

In some embodiments, the aforementioned detection process is a ToF (Time of Flight) process. Specifically, the detection circuit 130 can use the antenna element 110 to transmit the detection signal ST to the object 190, and then to receive a feedback signal SF from the object 190. For example, both the detection signal ST and the feedback signal SF may operate in a UWB frequency band (they may be also considered as "UWB signals") from 3.1 GHz to 10.6 GHz. Next, the detection circuit 130 can calculate the aforementioned estimated distance DE by analyzing the generation time point of the detection signal ST and the reception time point of the feedback signal SF.

However, since the length L of the transmission line 120 is not equal to 0, the existence of the transmission line 120 will negatively affect the accuracy of the estimated distance DE. In some embodiments, the transmission delay time T of the UWB signal in the transmission line 120 is described in the following equation (2):

$$T = \frac{L}{v} \qquad (2)$$

where "T" represents the transmission delay time T, "L" represents the length L of the transmission line 120, and "v" represents the transmission speed of the UWB signal in the transmission line 120.

Because the aforementioned transmission delay time T is added, the estimated distance DE of the detection circuit 130 should be longer than the real distance DT between the antenna element 110 and the object 190. For example, the estimated distance DE may be longer than the real distance DT by about the same amount as the error distance DR, which is described in the following equation (3):

$$DR = c \cdot T = \left(\frac{c}{v}\right) \cdot L \qquad (3)$$

where "DR" represents the error distance DR, "c" represent the speed of light, "T" represents the transmission delay time T, "L" represents the length L of the transmission line 120, and "v" represents the transmission speed of the UWB signal in the transmission line 120.

As mentioned above, the error distance DR is substantially proportional to the length L of the transmission line 120. That is, if the length L of the transmission line 120 increases, the error distance DR will become longer. Conversely, if the length L of the transmission line 120 decreases, the error distance DR will become shorter. In some embodiments, the transmission speed of the UWB signal in the transmission line 120 is about $1.9 \times 10^8$ (m/s), and the speed of light is about $3 \times 10^8$ (m/s). Thus, the error distance DR may be substantially equal to 1.58 times the length L of the transmission line 120.

With such a design of the invention, the processor 150 can calculate the calibrated distance DC by subtracting the error distance DR from the estimated distance DE, and therefore it can almost completely eliminate the non-ideal effect caused by the transmission line 120.

Figure 2:
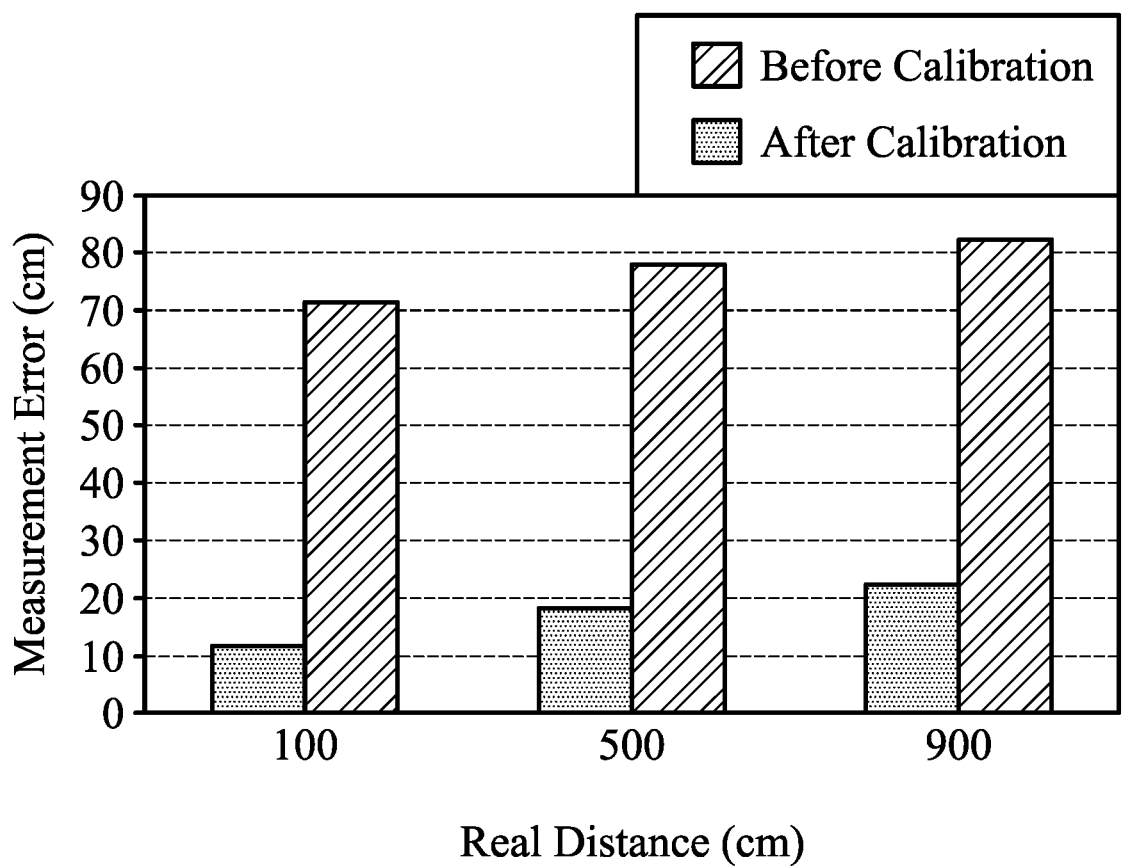
FIG. 2 is a diagram of measurement error according to an embodiment of the invention.

FIG. 2 is a diagram of measurement error according to an embodiment of the invention. As shown in FIG. 2, each bar on the right represents the measurement error between the estimated distance DE and the real distance DT before the calibration is performed, and each bar on the left represents the measurement error between the calibrated distance DC and the real distance DT after the calibration is performed. According to the comparison result of FIG. 2, after the calibration function of the invention is applied, the measurement error caused by the length L of the transmission line 120 can be significantly reduced.

Figure 3:
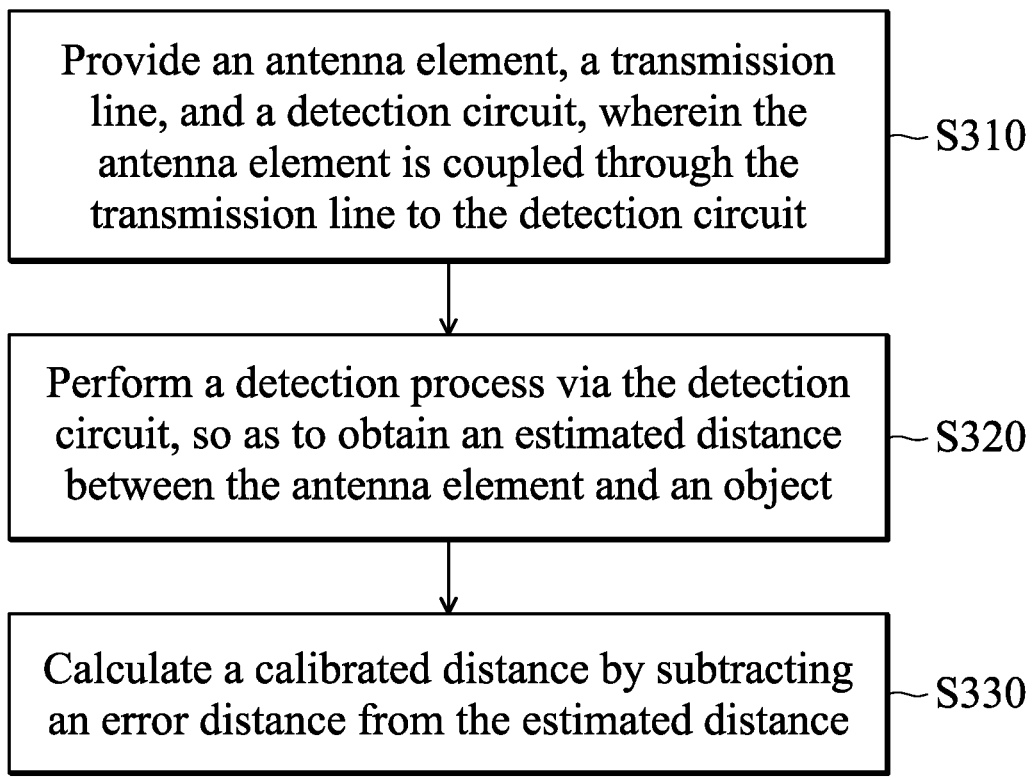
FIG. 3 is a flowchart of a detection method with a calibration function according to an embodiment of the invention.

FIG. 3 is a flowchart of a detection method with a calibration function according to an embodiment of the invention. Initially, in step S310, an antenna element, a transmission line, and a detection circuit are provided. The antenna element is coupled through the transmission line to the detection circuit. In step S320, a detection process is performed via the detection circuit, so as to obtain an estimated distance between the antenna element and an object. Finally, in step S330, the calibrated distance is calculated by subtracting the error distance from the estimated distance. It should be understood that these steps are not required to be performed sequentially. Every feature of the embodiments of FIG. 1 and FIG. 2 may be applied to the detection method of FIG. 3.

The invention proposes a novel detection device and a novel detection method with the function of self-calibration. In comparison to the conventional design, the invention has at least the advantages of suppressing the non-ideal effect of the transmission line and minimizing the measurements error, and therefore it is suitable for application in a variety of mobile communication devices.

Note that the above element parameters are not limitations of the invention. An antenna designer can fine-tune these settings or values according to different requirements. It should be understood that the detection device and the detection method of the invention are not limited to the configurations of FIGS. 1-3. The invention may merely include any one or more features of any one or more embodiments of FIGS. 1-3. In other words, not all of the features displayed in the figures should be implemented in the detection device and the detection method of the invention.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A detection device with a calibration function for detecting an object, comprising:
   an antenna element;
   a transmission line, coupled to the antenna element;
   a detection circuit, coupled to the transmission line, wherein the detection circuit performs a detection process, so as to obtain an estimated distance between the antenna element and the object; and
   a processor, coupled to the detection circuit, wherein the processor calculates a calibrated distance by subtracting an error distance from the estimated distance;
   wherein the error distance is proportional to a length of the transmission line;
   wherein the error distance is substantially equal to 1.58 times the length of the transmission line.

2. The detection device as claimed in claim 1, wherein the detection process is a ToF (Time of Flight) process.

3. The detection device as claimed in claim 1, wherein the detection circuit uses the antenna element to transmit a detection signal to the object.

4. The detection device as claimed in claim 3, wherein the detection circuit uses the antenna element to receive a feedback signal from the object.

5. The detection device as claimed in claim 4, wherein both the detection signal and the feedback signal operate in a UWB (Ultra-Wide Band) frequency band.

6. A detection method with a calibration function, comprising the steps of:
   providing an antenna element, a transmission line, and a detection circuit, wherein the antenna element is coupled through the transmission line to the detection circuit;
   performing a detection process via the detection circuit, so as to obtain an estimated distance between the antenna element and an object; and
   calculating a calibrated distance by subtracting an error distance from the estimated distance;
   wherein the error distance is proportional to a length of the transmission line;
   wherein the error distance is substantially equal to 1.58 times the length of the transmission line.

7. The detection method as claimed in claim 6, wherein the detection process is a ToF process.

8. The detection method as claimed in claim 6, wherein the detection process comprises:
   using the antenna element to transmit a detection signal to the object.

9. The detection method as claimed in claim 8, wherein the detection process further comprises:
   using the antenna element to receive a feedback signal from the object.

10. The detection method as claimed in claim 9, wherein both the detection signal and the feedback signal operate in a UWB frequency band.

* * * * *